(12) United States Patent
Schwarz, Jr.

US006945453B1

(10) Patent No.: US 6,945,453 B1
(45) Date of Patent: Sep. 20, 2005

(54) SYSTEM AND METHOD FOR FUNDING A COLLECTIVE ACCOUNT BY USE OF AN ELECTRONIC TAG

(75) Inventor: Charles E. Schwarz, Jr., Wilmington, DE (US)

(73) Assignee: Bank One Delaware N.A., Wilmington, DE (US)

( * ) Notice: Subject to any disclaimer, the term of this patent is extended or adjusted under 35 U.S.C. 154(b) by 38 days.

(21) Appl. No.: 09/927,462

(22) Filed: Aug. 13, 2001

(51) Int. Cl.$^7$ ............................................. G06F 17/00
(52) U.S. Cl. ...................... 235/375; 235/380; 235/382; 235/384; 235/487; 235/492; 340/871.17; 705/1; 705/14
(58) Field of Search ................................ 235/375, 380, 235/382, 384, 383, 487, 492; 705/1, 13, 14, 705/17; 340/870.17

(56) References Cited

U.S. PATENT DOCUMENTS

| | | |
|---|---|---|
| 3,946,206 A | 3/1976 | Darjany |
| 4,047,033 A | 9/1977 | Maimberg |
| 4,545,838 A | 10/1985 | Minkus |
| 4,750,119 A | 6/1988 | Cohen et al. |
| 4,831,242 A | 5/1989 | Englehardt |
| 4,897,533 A | 1/1990 | Lyszczarz |
| 4,978,401 A | 12/1990 | Bonomi |
| 5,025,372 A | 6/1991 | Burton et al. |
| 5,056,019 A | 10/1991 | Schultz et al. |
| 5,095,194 A | 3/1992 | Barbanell |
| 5,117,355 A | 5/1992 | McCarthy |
| 5,175,416 A | 12/1992 | Mansvelt |
| 5,192,947 A | 3/1993 | Neustein |
| 5,202,826 A | 4/1993 | McCarthy |
| 5,297,026 A | 3/1994 | Hoffman |
| 5,326,960 A | 7/1994 | Tannenbaum |
| 5,397,881 A | 3/1995 | Mannik |
| 5,424,524 A | 6/1995 | Ruppert |
| 5,450,477 A | 9/1995 | Amarant |
| 5,459,306 A | 10/1995 | Stein et al. |
| 5,465,206 A | 11/1995 | Hilt |
| 5,466,919 A * | 11/1995 | Hovakimian ................. 705/17 |
| 5,471,669 A | 11/1995 | Lidman |
| 5,477,038 A | 12/1995 | Levine |
| 5,482,139 A | 1/1996 | Rivalto |
| 5,500,514 A | 3/1996 | Veeneman |
| 5,530,232 A | 6/1996 | Taylor |
| 5,578,808 A | 11/1996 | Taylor |
| 5,585,787 A | 12/1996 | Wallerstein |
| 5,621,640 A | 4/1997 | Burke |
| 5,637,845 A | 6/1997 | Kolls |
| 5,703,344 A | 12/1997 | Bezy |
| 5,710,886 A | 1/1998 | Christensen |
| 5,721,768 A | 2/1998 | Stimson |
| 5,729,693 A | 3/1998 | Holda-Fleck |
| 5,745,049 A * | 4/1998 | Akiyama et al. ...... 340/870.17 |
| 5,765,141 A | 6/1998 | Spector |

(Continued)

OTHER PUBLICATIONS

E-Z Pass, Web page, Nov. 12, 2001, http://www.ezpass.com/whatis.html.

(Continued)

*Primary Examiner*—Steven S. Paik
(74) *Attorney, Agent, or Firm*—Hunton & Williams LLP

(57) ABSTRACT

A system and method for funding a collective account via aggregating usage of electronic tags is disclosed. The system and method promotes the use of electronic tags, and the funding of collective accounts that may be associated with charitable or other philanthropic causes. Further benefits may be realized by replenishing the prefunded account that serves as the source of funds for the electronic tag to an affinity account that also benefits the charitable or other philanthropic cause.

39 Claims, 4 Drawing Sheets

U.S. PATENT DOCUMENTS

| | | | |
|---|---|---|---|
| 5,774,870 A | 6/1998 | Storey | |
| 5,777,305 A | 7/1998 | Smith | |
| 5,787,404 A | 7/1998 | Fernandez-Holman | |
| 5,819,234 A * | 10/1998 | Slavin et al. | 340/10.4 |
| 5,857,709 A | 1/1999 | Chock | |
| 5,864,830 A | 1/1999 | Armetta et al. | |
| 5,870,718 A | 2/1999 | Spector | |
| 5,926,800 A | 7/1999 | Baronowski et al. | |
| 5,955,961 A | 9/1999 | Wallerstein | |
| 5,974,399 A | 10/1999 | Giuliani et al. | |
| 5,991,750 A | 11/1999 | Watson | |
| 6,018,718 A | 1/2000 | Walker et al. | |
| 6,036,099 A | 3/2000 | Leighton | |
| 6,038,552 A | 3/2000 | Fleischl et al. | |
| 6,061,660 A | 5/2000 | Eggleston et al. | |
| 6,070,153 A | 5/2000 | Simpson | |
| 6,078,888 A * | 6/2000 | Johnson, Jr. | 705/1 |
| 6,109,525 A * | 8/2000 | Blomqvist et al. | 235/384 |
| 6,116,954 A | 9/2000 | Ries | |
| 6,128,599 A * | 10/2000 | Walker et al. | 705/14 |
| 6,243,688 B1 | 6/2001 | Kalina | |
| 6,263,316 B1 * | 7/2001 | Khan et al. | 705/13 |
| 6,265,977 B1 * | 7/2001 | Vega et al. | 340/572.7 |
| 6,463,039 B1 * | 10/2002 | Ricci et al. | 370/277 |
| 6,505,780 B1 * | 1/2003 | Yassin et al. | 235/492 |
| 6,529,880 B1 * | 3/2003 | McKeen et al. | 705/17 |

OTHER PUBLICATIONS

E-Z Pass, Web page, Nov. 12, 2001, http://www.ezpass.com/frameMain.htm.

E-Z Pass, Web page, Nov. 12, 2001, http://www.ezpass.com/Disc_portNewYork.htm.

E-Z Pass, Web page, Nov. 12, 2001, http://www.ezpass.com/Disc_ny_annual.htm.

CardEx Incentives, Apr. 6, 1999, www.cardexco.com.

"Associates First Capital Corporation", Hoover's Inc., The Industry Standard: The Newsmagazine of the Internet Economy, thestandard.net/companies/cpmpany-display, Apr. 6, 1999.

Jeffrey M. Lacker, "Stored Value Cards: Costly Private Substitutions for Government Currency", Economic Quarterly, 1996.

"The Evolution of a New Consumerism", Chain Store Age, vol. 73, pp. 8-9, Jun. 1997.

Lisa Fickenscher, "Amex prepaid offering is latest card for firms regarding employees", American Banker, vol. 161, No. 151, p. 11, Aug. 8, 1996.

"Welcome to Swiftgift", Swiftgift, www.swiftgiftcard.com, Dec. 8, 1998.

Lucy Lzarony, "Stuck for a gift? Give a prepaid credit card", www.bankrate.com, Dec. 21, 1998.

Antoinette Coulton, "Incentives field moving to card-based series 14", American Banker, Mar. 26, 1998.

Credit Card News, "A store card issuer looks for lift from electronic gift certificates", Feb. 1, 1995.

Business Travel News, "Maritz gets mastercard's stamp of approval", Aug. 19, 1996.

Card News, vol. 6, No. 25, "D.C. Area Safeway stores look for increase in sales volume and revenue with cards", Dec. 1991.

Spurgin, "Sopininmon! or What's happening in the retail credit card environment", Credit World Journal, Apr. 1997.

AT&T Marketing, "Universal card free lifetime membership extended 3 months", www.att.com/press/0297/970217.csa.html, Dec. 4, 1990.

Chain Store Age Executive with Shopping Center Age, "More retailers turn to co-branding", Feb. 1, 1995.

Introducing SpendingMoney(TM), Armetta: Marketing & Design Product Concept Report, Oct. 9, 1996.

First USA Platinum Connect, First USA Bank, First USA Promotional Mailing, Oct. 1997.

Introducing the First USA Platinum Connect Card, First USA Promotional Mailing, Dec. 1997.

Here's the calling convenience you asked for: 1-800-call-AT&T . . . For All Calls, Feb. 17, 1997. Appendix A: For Card Carriers.

Beth Piskora, Debit Cards Seen Poised for New Markets, American Banker, pp. 16, Mar. 7, 1995.

Nick Rosen, Cash Just Isn't Flexible Enough: Shops of the Future Will Only Take Cards, Daily Express: Technology Section, Feb. 10, 1995.

Phil Britt, Competing in Auto Lending, America's Community Banker, vol. 5, No. 11, pp. 33-37, Nov. 1, 1996.

Miriam Krenin Souccar, Smart Cards: 1st Union Smart Card Pilot Enlists a Second Army Base, American Banker, Mar. 31, 1999.

First Union Issues Smart Cards to Fort Benning Recruits, CardFax, Mar. 26, 1999.

Emerson Brown and Jim Baum, Purchasing Card Magic: Eli Lilly Finds Accounts Payable Flying High With Plastic, Corporate Cashflow, Nov. 1994.

Christine Dugas, Payroll May Ask: Paper or Plastic?, USA Today, 3B, Aug. 14, 2001.

Debit Card News, vol. 2, Issue 2, "Boatman's floats stored value into the employee incentive waters", Jul. 16, 1996.

International Search Report for Application No. PCT/US01/03587 filed on Feb. 9, 2000 and dated Apr. 27, 2001.

International Preliminary Examination Report for Application No. PCT/ USO1/03587 filed on Feb. 9, 2000 and dated Jul. 18, 2002.

* cited by examiner

SYSTEM AND METHOD FOR FUNDING A COLLECTIVE ACCOUNT BY USE OF AN ELECTRONIC TAG

FIELD OF THE INVENTION

The invention relates generally to the funding of collective accounts through the use of electronic tags ("tag" or "tags"). More specifically, the invention relates to systems and methods for funding a collective account that may be used for a variety of purposes, such as making charitable contributions or otherwise contributing to causes, based on tag usage and the "float" of a prefunded account associated with a tag.

BACKGROUND OF THE INVENTION

Electronic tags are used today to conduct various financial transactions. For instance, the Mobil® division of Exxon-Mobil Corporation sponsors a program called SPEED-PASS® whereby a customer can purchase gas and other goods and services by activating a system with a tag containing a transponder, where the tag is associated with some source of the customer's funds which are used to pay for the purchase. The tag may be kept on a keyring, and is waved in front of a detector to activate the system.

Another popular, rapidly growing use of electronic tags is in Electronic Toll Collection ("ETC") systems including E-Z PASS,® GEORGIA CRUISE CARD,® SUNPASS,® EPASS,® and FASTRAK,® among others, which allow a motorist to electronically charge a toll for using certain roadways without having to physically stop at a tollbooth to pay the toll. ETC systems are a part of the technology known as Intelligent Transportation Systems ("ITS") fostered by the Intelligent Transportation Society of America ("ITSA"), a society composed of private and public members which was mandated by the United States Congress in the Intermodal Surface Transportation transportation systems in the United States. ETC systems enhance the safety, capacity, and efficiency of the tollway systems in this country, as well as improve customer service and satisfaction. In addition, ETC systems improve air quality by reducing the number of vehicles which sit at idle speed at tollbooths.

The users of these tags generally associate a prefunded account to serve as a source of funds to pay for charges made with their tags, where the prefunded account balance is referred to as the "float." These prefunded accounts are maintained by the ETC system operator, who invests the account balances and makes a profit off this "float." The user may automatically replenish the prefunded account by instructing the system to charge additional "float" to an individual checking, savings, or credit card account or other source of funds that is associated with the tag when the prefunded account balance reaches a low limit, or the user may manually replenish the prefunded account balance.

ETC systems operate by detecting some tag identification information associated with the tag using some type of sensor as the motorist passes through a tollbooth or otherwise activates the sensor and determining which prefunded account is associated with that tag. Tag identification information may be contained in bar coded labels, which are placed on the vehicle and detected by laser scanners at the tollbooth. Alternatively, tag identification information may be transmitted via an RF or IR or other type of transponder located in the tag, where the emitted signal is read by a reader/antenna located at the tollbooth. Often the tags are intended to be attached to the motorist's front windshield or side window by some type of adhesive, and are, for the most part, contained in generic plastic casings which many consider unattractive to display.

When the tag identification information is detected by a scanner or reader/antenna at a tollbooth, the prefunded account associated with that tag is debited the amount of the corresponding toll or charge. Annual toll revenues for the nation's toll roads which use ETC systems easily exceed one billion dollars a year,[1] so enrollment of users in the nation's ETC systems contemplates a significant "float" potentially to be held by ETC systems operators.

[1] According to data compiled during the years of 1996 through 1999 by the ETTM, a component of the Intelligent Transportation Systems (ITS). See www.ettm.com/usafac.html.

Some potential ETC users currently do not enroll in the systems because they do not want to leave their money in the prefunded account where they lose the use of the account balance, and where they are committed to spending the prefunded account balance with the ETC system operator. Further, as noted, the tags currently used are considered plain and unattractive, which may lead some motorists not to mount the tags on their windshields, creating a safety hazard as those motorists fumble to find the tag to pay the toll.

SUMMARY OF THE INVENTION

The method and system of the invention overcomes these problems of the prior art, and adds an incentive for potential users to sign up for and to use ETC tag systems. As well, the invention provides ETC systems operators an incentive to make charitable and other contributions based on the users' tag usage and "float."

It is feature of the invention to provide a method and system for funding a collective account with a reward based either on aggregate tag usage of a plurality of tags associated with that collective account or on the aggregate of prefunded account balances for a plurality of prefunded accounts associated with the collective account.

It is another feature of the invention to provide an incentive for potential users of electronic tag systems to open and prefund accounts with electronic tag system operators.

It is yet another feature of the invention to facilitate a method for electronic tag systems operators to make charitable and other financial contributions.

It is yet another feature of the invention to provide an electronic tag that will increase public awareness of charitable or other political or educational causes.

It is yet another feature of the invention to facilitate the earning of rewards in a loyalty program sponsored by or otherwise associated with a for-profit or retail program, where the tag is associated with an individual account that is associated with the loyalty program.

It is another feature of the invention to provide an additional benefit to holders of collective accounts by prefunding accounts with individual accounts that are associated with and benefit the holders of the collective accounts through affinity programs.

It is another feature of the invention to encourage use of ETC systems by motorists and thereby benefiting the environment.

It is yet another feature of the invention to increase safety at toll booths by providing an electronic tag that motorists will want to install on their windshields.

One aspect of the invention relates to a method and system for funding a collective account comprising a plurality of tags and prefunded accounts associated with those tags, associating the tags or the "float" of the prefunded accounts to the collective account, aggregating either the tag usage or the prefunded account balances, calculating a reward based on the aggregate tag usage or prefunded account balances, and funding the reward to the collective account. The funds in the collective account may be used for a variety of purposes, such as making charitable contributions, funding political campaigns, or making contributions to religious or civic groups or educational institutions.

Another aspect of the invention relates to decorating a tag with a symbol, name, or color scheme of the target organization. Not only does such decoration increase public awareness of the tagholder's chosen cause, but it also increases the likelihood that the user (if a motorist) installs the tag on the windshield of the vehicle which increases highway safety by reducing motorist distraction as he or she fumbles to locate the tag as he or she approaches the toll booth.

Another aspect of the invention relates to a method and system for associating a prefunded account for a tag with an individual account that is itself associated with a loyalty program, and increasing credits in the loyalty program through use of the electronic tag. These loyalty program credits may inure to the benefit of the tagholder, as for example where the individual account amasses cash bonuses or frequent flyer miles upon individual account usage. Alternatively, the loyalty program benefits may inure to a charitable or other organization, as where the individual account is an affinity account that makes a contribution to a chosen card based on individual account usage. Further, an organization that is the beneficiary of both an affinity program associated with an individual account associated with a tag and is also the holder of a collective account associated with the same tag may receive double benefits from tag usage.

As used in this specification, the terms "tag" and "tags" refer to any known or later developed device or object, associated in some manner to a source of funds, that may be used to activate a system for automatically making purchases of goods or services and charge the purchase of those goods or services to the associated source of funds. The associated source of funds may itself be a prefunded account, and may also be associated with at least one other source of funds, as an individual account, to replenish the prefunded account balance.

Other features and advantages of the invention will become apparent from the description of the preferred embodiments in conjunction with the following figures.

BRIEF DESCRIPTION OF THE DRAWINGS

The invention will be described with reference to the accompanying drawings, in which like elements are referenced with like numerals.

DETAILED DESCRIPTION OF THE INVENTION

Figure 1:
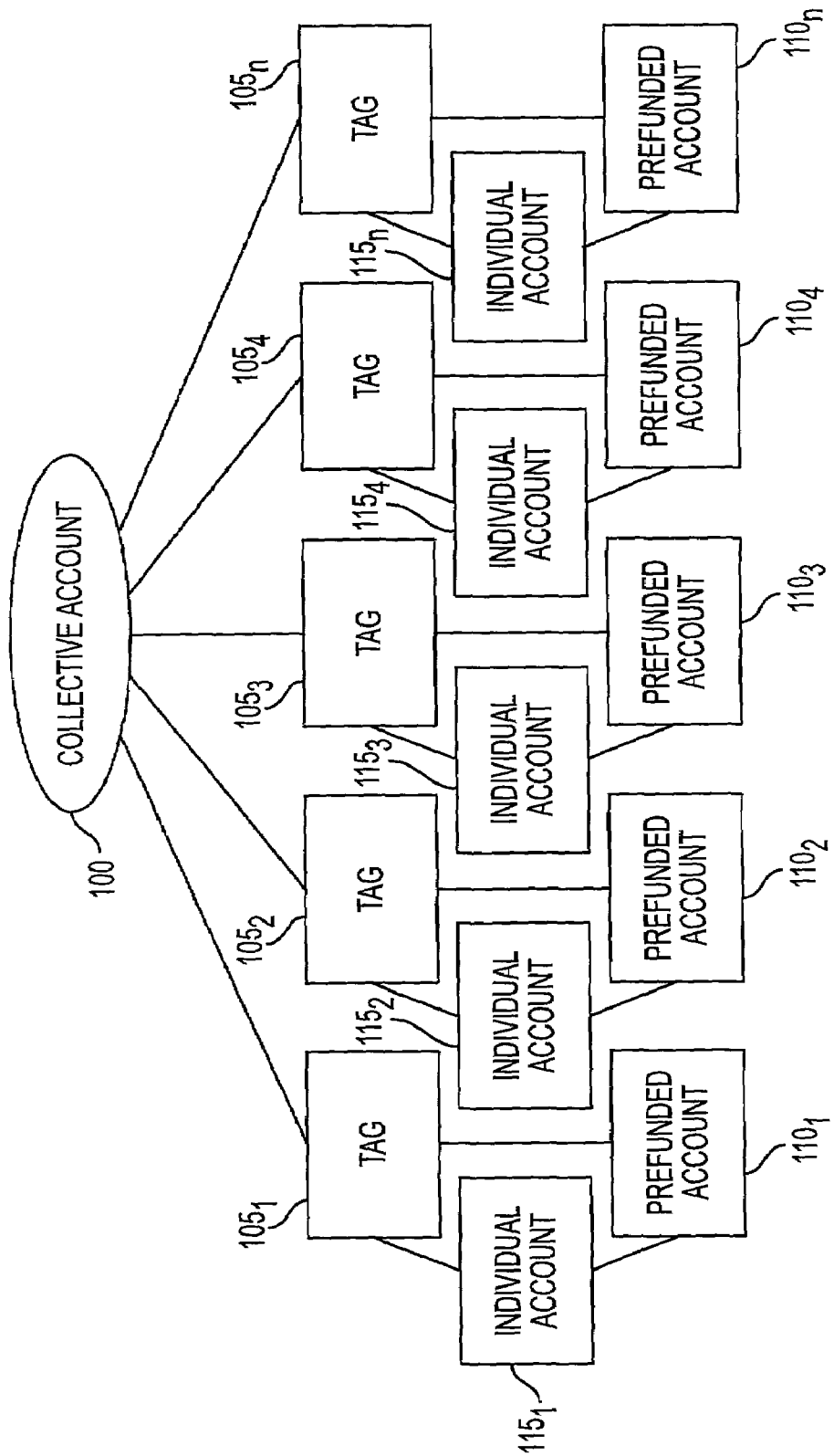
FIG. 1 is a schematic of one embodiment of the invention illustrating a plurality of tags each associated with an individual account, a prefunded account, and a collective account.

The invention relates generally to a method and system for funding a collective account through the use of electronic tags, or through profits made off the "float" of the prefunded accounts associated with those tags. One embodiment of the invention may comprise associating each of a plurality of tags to a prefunded account and a collective account, or alternatively associating the prefunded account directly to the collective account. The invention further comprises aggregating tag usage for all associated tags in the collective account. A reward may be calculated based on the aggregate tag usage for all tags associated with the collective account and the reward credited to the collective account, thus providing an incentive for tagholders to increase their use of ETC systems. The above steps can be accomplished in real time or on a periodic basis. The funds in the collective account may be used for a variety of purposes as, for example, funding of charitable, religious, political, or educational institutions. Individual tagholders may be members of the organization that is the holder of the collective account.

According to another embodiment of the invention, the reward to the collective account may be calculated based on the aggregate prefunded account balances for all prefunded accounts associated with the collective account, thus providing an incentive for tagholders to increase the "float" amounts kept in their prefunded accounts.

In another embodiment of the invention, the system operator may establish a number of collective accounts and designate each collective account for a particular purpose as an environmental purpose, charitable purpose, etc. Tagholders may associate all or a portion of their prefunded accounts and/or tag usage to one or more collective accounts. In this embodiment, it is not necessary that tagholders be members of any organization that is the holder of the collective account, and a single tagholder may associate his or her prefunded account and/or tag usage in percentages to multiple collective accounts.

Tagholders may be issued periodic reporting statements detailing the contributions made in relation to the association of their prefunded accounts and/or tags to collective accounts.

Another embodiment of the invention relates to a computer-based system for funding a collective account, wherein a tag is associated with prefunded and collective accounts. The system may include a host computer capable of programmed response and software capable of monitoring individual tag usage or prefunded account balances, aggregating tag usage or prefunded account balances, and calculating a bonus based on the aggregate tag usage or prefunded account balances of all prefunded accounts associated with a particular collective account. The computer may perform other functions as generating statements of the prefunded accounts to the tagholders and statements of the collective account to the holder of the collective account, and may also be capable of automatically initiating a funds transfer from an individual account associated with the tag and/or prefunded account to replenish the prefunded account based upon predetermined conditions, such as low prefunded account balance. In addition, a plurality of remote computers may be networked or otherwise capable of communicating with the host computer, where the remote computers are associated with reader/antennas at tollbooths or other sites where a tag may be used to purchase a good or service. The reader/antennas may be capable of detecting tag identification information and transmitting the tag identification information along with the charge to the remote computers, which can then transmit the information to the host computer to charge the associated prefunded account for that tag. Alternatively, remote computers may access the host computer for tag identification information, and identify the prefunded account before transmission of the charge information to the host computer.

In another embodiment of the invention, the tag and prefunded account may be associated with an individual account used as a source of funds to replenish the prefunded account based on fulfillment of predetermined conditions, as for example a predetermined low balance amount in the prefunded account. The individual account may be an affinity account, where an organization receives a benefit from use of the individual account. If the affinity organization is also the holder of the collective account, that organization can realize a double benefit from a tagholder's use of the tag—both from the affinity program when the individual account is used to fund the prefunded account, and again when the reward is calculated and awarded based on tag usage. In other embodiments, the individual account may be associated with a loyalty program, where benefits accrue directly to the tagholder upon use of the individual account. In this scenario, increased tag usage benefits the holder of the collective account, and also causes increased needs to replenish the prefunded account, which then benefits the tagholder directly by increased loyalty program credits.

The presence of an LED and/or LCD readout in the tag allows the user to view such information as remaining balance in his or her prefunded account or to receive and/or view messages transmitted from the reader/antenna. The tag may also have the ability to generate a sound that indicates a successful detection by the reader/antenna or a low prefunded account balance which might be a theme song associated with the holder of the collective account, as for example the fight song of a selected university. The tag may have a communication port to allow it to communicate with other devices, as for example relaying traffic information received from the reader/antenna to a device capable of reading and mapping out the relayed information within a vehicle or some remote or hard wired device.

The holder of the collective account can be an organization comprising a plurality of members. However, the tagholders are not necessarily members of the holder of the collective account, as the tagholders may designate different causes to receive the reward. The collective account may also comprise one or more sub-accounts, where each sub-account is designated for a different purpose.

The reward may be calculated in a number of ways. For example, the reward may be based on aggregate tag usage or aggregate "float" of the prefunded account balances associated with the collective account calculated over some period of time. Alternatively, the reward may be customized by basing it on a comparison of aggregate tag usage or aggregate "float" of the prefunded account balances during a given period to historic performance, where increased performance in the given period results in a proportionately greater reward. Alternatively, a minimum performance standard may be set to achieve any reward to be credited to the collective account.

Although the invention is described in terms of electronic tags associated with prefunded accounts, collective accounts, and individual accounts, this description is not intended to limit the invention but is rather one embodiment as will be apparent to those skilled in the art.

Referring now to FIG. 1, a schematic of one embodiment of the invention is detailed for funding a collective account 100 such as a charitable contribution account. The invention comprises a plurality of tags $105_1$ through $105_n$, each tag associated with at least one prefunded account $110_1$ through $110_n$. Also, each tag may be associated with a collective account 100, as selected by the tagholder. Alternatively, each prefunded account $110_n$ may be associated directly with the collective account 100, or each tag $105_n$ may be associated with multiple collective accounts (not shown). The invention further comprises aggregating the tag usage for at least some of the tags associated with the collective account 100, calculating a reward based on the aggregate tag usage, and funding the collective account 100 with the calculated reward. Alternatively, for tags associated with multiple collective accounts, the tagholder may select the percentage of tag usage to be associated with each collective account. In other embodiments, account balances of prefunded accounts $110_1$ through $110_n$ may be aggregated for purposes of calculating the reward. The tags and prefunded accounts may also be associated with individual accounts $115_1$ through $115_n$, which may be used as a source of funds to replenish the prefunded accounts $110_1$ through $110_n$ upon fulfillment of a predetermined condition, as a low prefunded account balance.

Figure 2:
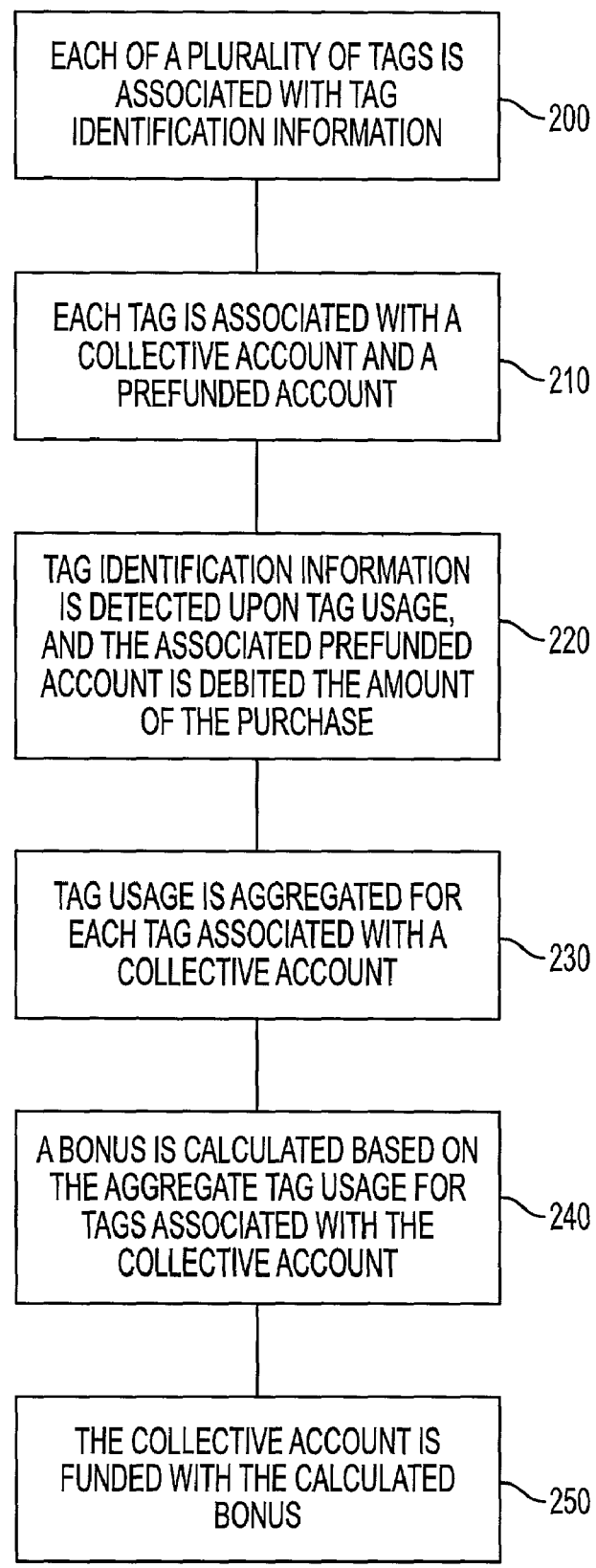
FIG. 2 is a flowscheme of one embodiment of the invention.

A flowscheme of one embodiment of the invention is shown in FIG. 2. At 200, each tag is associated with some tag identification information, which could be detected in various manners as IR or RF transmissions or bar code scanners. At 210, each tag is associated with a prefunded account within the ETC system as well as at least one collective account. When the tag identification information is detected by a reader/antenna during tag usage at 220, it is used by the ETC system to identify the specific tag and associated prefunded account. The detector could detect signals emitted by a transponder located in the electronic tag, as RF or IF signals, or alternatively the tag may comprise a bar code which is detectable by a sensor. Regardless of the form of detection, the ETC system debits the prefunded account associated with the identified tag for the amount of the toll or purchase. Tag usage, or portion of tag usage, can be aggregated for each tag associated with the collective account at 230. At 240, a bonus or reward can be calculated based on aggregate tag usage for a collective account, which is credited to the collective account at 250.

Figure 3:
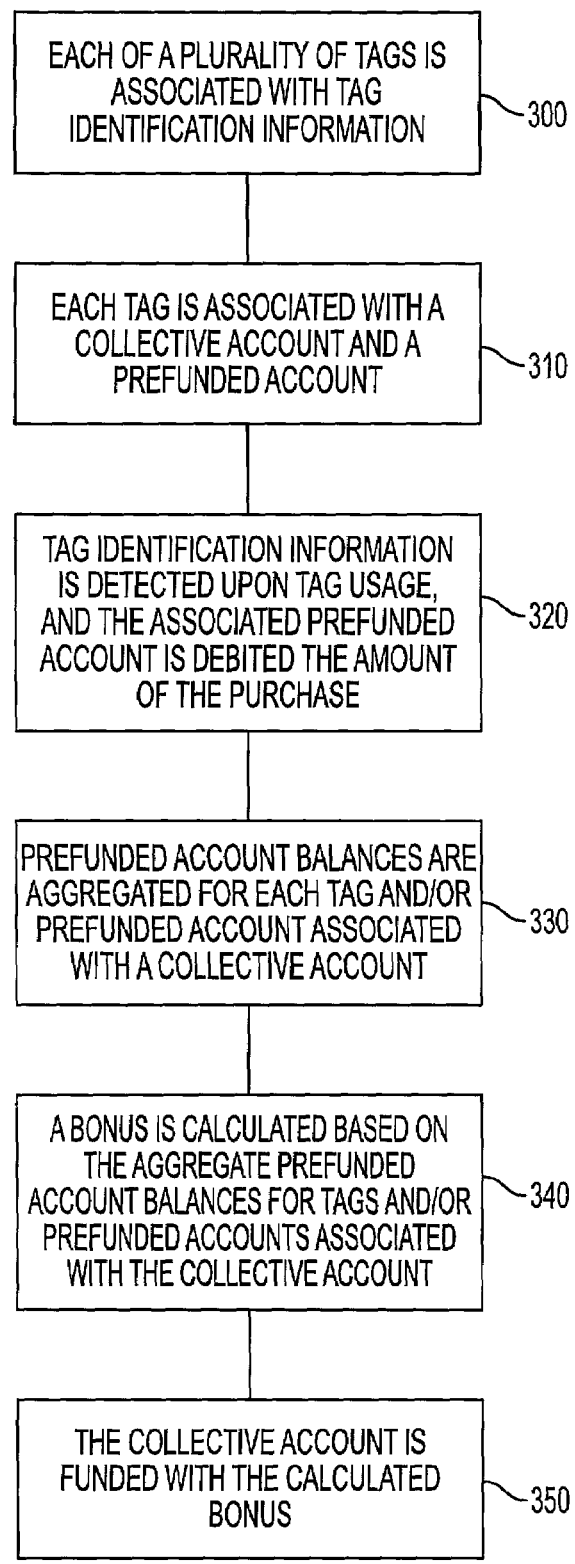
FIG. 3 is a flowscheme of an alternative embodiment of the invention

A flowscheme of an alternative embodiment of the invention is shown in FIG. 3. At 300, each tag is associated with some tag identification information, which could be detected in various manners as IR or RF transmissions or bar code scanners. At 310, each tag is associated with a prefunded account within the ETC system as well as at least one collective account. When the tag identification information is detected by a reader/antenna during tag usage at 320, it is used by the ETC system to identify the specific tag and associated prefunded account. The detector could detect signals emitted by a transponder located in the electronic tag, as RF or IF signals, or alternatively the tag may comprise a bar code which is detectable by a sensor. Regardless of the form of detection, the ETC system debits the prefunded account associated with the identified tag for the amount of the toll or purchase. On some periodic basis, prefunded account balances can be aggregated for each prefunded account associated directly with, or indirectly through a tag with, the collective account at 330. At 340, a bonus or reward can be calculated based on aggregate prefunded account balances for a collective account, which is credited to the collective account at 350.

Figure 4:
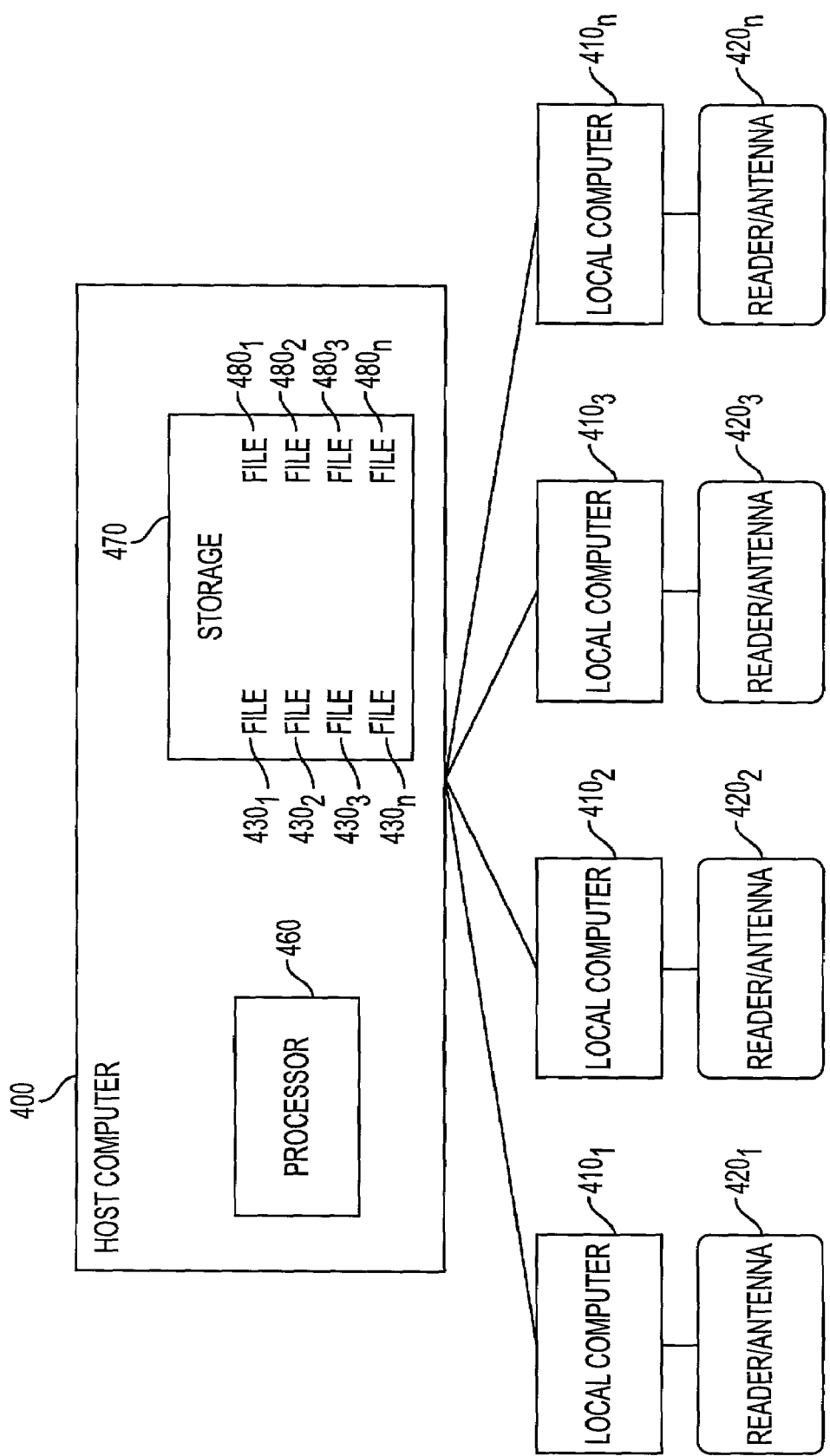
FIG. 4 is a schematic of a computer-based system for funding a collective account.

Referring to FIG. 4, one embodiment of a computer-based system for funding a collective account is described. The ETC system may have a host computer 400, a plurality of remote computers 410₁ through 410ₙ, and a plurality of reader/antennas 420₁ through 420ₙ associated with remote computers 410₁ through 410ₙ. The host computer has a processor 460 capable of programmed response, and also has a storage unit 470, which may comprise a hard drive or other magnetic, solid state or other storage media, for storing applications, data, operating system and other information.

Upon or anytime after tagholder enrollment with the ETC, searchable indexed computer files 430₁ through 430ₙ are created by the host computer processor 460 for each enrolled tagholder and stored in the host computer storage 470. The files 430₁ through 430ₙ may contain such information as an individual tagholder's name, address, tag identification information, prefunded account information, tag usage, and selected collective account(s). The files 430₁ through 430ₙ may also contain information identifying individual accounts that may be used to replenish the prefunded account balances. Each account can be indexed by the tag identification information, name, and selected collective account. Also, files 480₁ through 480ₙ may be created by processor 460 and stored in storage 470 containing information for a plurality of collective accounts.

A plurality of readers/antenna 420₁ through 420ₙ may be located at remote locations from the host computer 400 at the sights where the tagholders use the tags to purchase goods or services. The tag can transmit or is otherwise detectable to provide the tag identification information. Each reader/antenna 420ₙ may be associated with and capable of communicating with a remote computer 410ₙ, where each remote computer is capable of communicating with and transmitting information to and receiving information from the host computer 400. In addition, each local computer 410ₙ may also have a processor capable of programmable response and storage capability.

When a tag is detected by the reader/antenna 420ₙ for a purchase of a good or a service, tag identification information can be recorded in the local computer 410ₙ along with the amount of the charge. Either in real time or on a periodic basis, the local computer 410ₙ can communicate with the host computer 400 and transmit the detected tag identification information along with the associated charge amount. Using the tag identification information, the host computer 400 can access the file 430ₙ indexed by that tag identification information, and debit the prefunded account associated with that file for the charge amount.

Either in real time or on a periodic basis, the processor 460 of the host computer 400 can access all tags and/or prefunded accounts that are associated with a certain collective account 480ₙ and either aggregate the total tag usage or the "float" of the prefunded account balances for the prefunded accounts associated with that collective account. A reward can be calculated based on these aggregates, and the processor 460 can initiate a funds transfer in an amount equal to the reward to the collective account 480ₙ.

The foregoing embodiments have been presented for the purpose of illustration and description only and are not to be construed as limiting the scope of the invention in any way. The scope of the invention is to be determined from the claims appended hereto.

What is claimed is:

1. A method for distributing a reward, comprising:
    associating a tag with an individual account, a financial institution and at least one organization, wherein the tagholder is the holder of the individual account, wherein further the financial institution comprises one or more host computers, wherein further the host computer aggregates tag usage and calculates a first reward based on aggregate tag usage, wherein tag usage comprises aggregating purchase amounts for purchases of at least one of goods or services from a plurality of merchants when the tag is presented to the merchant at time of purchase;
    attributing the first reward to the individual account;
    attributing a second reward to a collective account associated with the at least one organization, wherein the at least one organization comprises at least one of a business organization, a trade organization, a political party, a religious organization, an athletic organization, a professional society, an educational organization, a charitable organization, a fund-raising organization, and a governmental organization, or combinations thereof; and
    distributing the first reward to the tagholder upon demand by the tagholder to the financial institution.

2. The method of claim 1, further comprising:
    associating the tag with at least one prefunded account, wherein the prefunded account has a balance;
    maintaining at least one of the prefunded accounts; and
    debiting the balance of at least one of the prefunded accounts in an amount related to tag usage.

3. The method of claim 2, further comprising replenishing the prefunded account balance with funds from the individual account associated with the tag upon fulfillment of some predetermined condition.

4. The method of claim 2, wherein the individual account is associated with at least one loyalty program, wherein further the tagholder earns a third reward based on the tagholder's participation in the loyalty programs.

5. The method of claim 1, wherein the second reward is calculated based on aggregate tag usage.

6. The method of claim 1, wherein the tag is branded with a symbol, name and/or colors generally associated with the at least one organization.

7. The method of claim 1, wherein the tag comprises a sound generating device.

8. The method of claim 7, wherein the sound generating device generates a programmed sound generally associated with the organization.

9. The method of claim 1, wherein one or both of the first and second rewards comprise cash, airline miles, reward points, services, goods, rebates, up front payments, statement credit, discounts or combinations thereof.

10. The method of claim 1, wherein the tagholder selects the organization.

11. The method of claim 1, wherein the tagholder earns a fourth reward from the issuer of the individual account based on individual account usage.

12. The method of claim 1, wherein the tag comprises an LED controllable via the tagholder.

13. The method of claim 1, wherein the tag comprises an LCD controllable via the tagholder.

14. The method of claim 1, wherein the tag comprises at least one communication port allowing the tag to communicate with other devices.

15. The method of claim 1, wherein the tag comprises a microprocessor.

16. The method of claim 1, wherein the tag comprises a transmitter.

17. The method of claim 1, wherein the tag further comprises at least one of a smart card, a plastic card, a bar coded sticker, a transponder readable by a reader/antenna, or combinations thereof.

18. The method of claim 17, wherein the tag operates in half duplex mode.

19. The method of claim 17, wherein the tag operates in full duplex mode.

20. The method of claim 1, wherein the individual account comprises a credit account, a debit account or a stored value account.

21. The method of claim 1, wherein the tagholder makes the demand substantially upon association of the tag with the individual account.

22. The method of clam 21, wherein the demand comprises automatic distribution of the first reward to the individual account substantially upon tag usage.

23. The method of claim 21, wherein the demand comprises automatic periodical distribution of the first reward to the individual account.

24. An automated, computer-based method for distributing rewards to an individual account and a collective account comprising:

maintaining a prefunded first account that is associated with at least one tag, wherein the prefunded first account has an account balance, wherein further the tag is associated with the tagholder, a financial institution and at least one organization, wherein further the financial institution comprises one or more host computers, wherein further the host computer aggregates tag usage and calculates a first reward based on aggregate tag usage, wherein tag usage comprises funding purchases for at least one of goods or services from a plural of merchants with the prefunded account when the tag is presented to the merchant at time of payment for the purchases;

associating the prefunded first account with a second account;

attributing the first reward to the second account;

attributing a second reward to a collective account associated with the at least one organization, wherein the at least one organization comprises at least one of a business organization, a trade organization, a political party, a religious organization, an athletic organization, a professional society, an educational organization, a charitable organization, a fund-raising organization, and a governmental organization, or combinations thereof; and distributing the first reward to the tagholder upon demand by the tagholder.

25. The method of claim 24, wherein the second reward is calculated based on aggregate tag usage.

26. The method of claim 24, wherein the tag is branded with a symbol, name and/or colors generally associated with the at least one organization.

27. The method of claim 24, wherein the tag comprises a sound generating device.

28. The method of claim 27, wherein the sound generating device generates a programmed sound generally associated with the organization.

29. The method of claim 24, wherein one or both of the first and second rewards comprise cash, airline miles, reward points, services, goods, rebates, up front payments, statement credit, discounts or combinations thereof.

30. The method of claim 24, wherein the tagholder selects the organization.

31. The method of claim 24, wherein the tagholder earns a third reward from the issuer of the second account based on second account usage.

32. The method of claim 24, wherein the tag comprises an LED controllable via the tagholder.

33. The method of claim 24, wherein the tag comprises an LCD controllable via the tagholder.

34. The method of claim 24, wherein the tag comprises at least one communication port allowing the tag to communicate with other devices.

35. The method of claim 24, wherein the tag comprises a microprocessor.

36. The method of claim 24, wherein the tag comprises a transmitter.

37. The method of claim 24, wherein the tag further comprises at least one of a smart card, a plastic card, a bar coded sticker, a transponder readable by a reader/antenna, or combinations thereof.

38. The method of claim 37, wherein the tag operates in half duplex mode.

39. The method of claim 38, wherein the tag operates in full duplex mode.

* * * * *